United States Patent [19]
Sugimura et al.
[11] Patent Number: 4,907,621
[45] Date of Patent: Mar. 13, 1990

[54] BLADDER-TYPE ACCUMULATOR WITH MOVABLE CUP-SHAPED SENSOR

[76] Inventors: Nobuyuki Sugimura; Kazuo Sugimura, both of 308, Mabase, Shimizu-shi, Shizuoka-ken, Japan

[21] Appl. No.: 272,410

[22] Filed: Nov. 17, 1988

[30] Foreign Application Priority Data

Mar. 4, 1988 [JP] Japan ........................ 63-029064[U]
Apr. 28, 1988 [JP] Japan ........................ 63-106989

[51] Int. Cl.⁴ ........................ F16L 55/04
[52] U.S. Cl. ........................ 138/30; 138/104; 200/83 L
[58] Field of Search ........................ 138/26, 30, 104; 220/85 B; 73/304 C, 40; 137/593, 207; 200/83 L

[56] References Cited

U.S. PATENT DOCUMENTS

| | | | |
|---|---|---|---|
| 1,875,732 | 9/1932 | Holttum | 138/30 |
| 3,654,956 | 4/1972 | Tsubouchi | 138/30 |
| 3,862,646 | 1/1975 | Tarsha | 138/30 |
| 3,929,163 | 12/1975 | Schön | 138/30 |
| 4,301,827 | 11/1981 | Murthy et al. | 138/30 |
| 4,518,005 | 5/1985 | Allewitz | 138/30 |
| 4,714,093 | 12/1987 | Kawano | 138/30 |
| 4,784,182 | 11/1988 | Sugimura | 138/30 |
| 4,788,851 | 12/1988 | Brault | 138/30 |

*Primary Examiner*—James E. Bryant, III
*Attorney, Agent, or Firm*—Wood, Dalton, Phillips, Mason & Rowe

[57] ABSTRACT

A guide projecting into a bladder is provided on a plug of a vessel body. A cup-shaped sensor is slidably provided on the guide, and an element for actuating a switch is provided on the cup-shaped sensor. The cup-shaped sensor is caused to slide along the guide by the bladder deformable in accordance with change in the pressure of liquid within the accumulator, so as to actuate the switch.

11 Claims, 8 Drawing Sheets

BLADDER-TYPE ACCUMULATOR WITH MOVABLE CUP-SHAPED SENSOR

BACKGROUND OF THE INVENTION

The present invention relates to an accumulator used for such purposes as accumulating and buffering a liquid under pressure and, more specifically, to a bladder-type accumulator with a movable cup-shaped sensor, which is adapted to detect a prescribed amount of liquid stored in a vessel body, by the use of a cup-shaped sensor provided in a bladder.

In a bladder-type accumulator, a set amount of gas is charged into a bladder provided inside a vessel body in an air-tight manner, and a fluid is introduced into or discharged from the space defined between the bladder and the vessel body in opposition to the pressure of the gas.

The amount of liquid stored in the vessel body is obtained by calculating it indirectly from change in pressure of the liquid, on condition that the pressure of the gas charged in the bladder is constant. However, it is impossible to obtain a correct amount of the stored liquid if the above-mentioned condition is changed by a factor such as gas leakage.

This is because, such a change in that condition causes a variation in the amount of liquid stored in the vessel.

To cope with this problem, it is the general practice to set the volume of the accumulator to a value larger than necessary.

If liquid of an amount greater than prescribed is introduced into the vessel body due, for instance, to gas leakage, the bladder is compressed beyond its allowable compression limit, and, as the amount of gas filling the bladder diminishes to none, the bladder is forced into a gas supply port or the like formed in the plug, and thus becomes broken.

If the bladder is broken in this way, the accumulator will suffer from gas leakage, hence, it will become unable to perform its functions such as the accumulation and buffering of a liquid under pressure. Therefore, such an incident can give a fatal damage to the accumulator.

To cope with the problem, it has hitherto been proposed to provide a holder projecting into the bladder inside the vessel body, and to fix first and second umbrella-shaped sensors to the holder with an interval therebetween, so that the amount of liquid stored is detected by the sensors (Japanese Utility Model Application No. 192944/1985).

With the bladder-type accumulator according to this proposal, detection is performed at two points within the bladder by the use of the two umbrella-shaped sensors. However, since these sensors are fixed, it is not possible to move the detection points or to perform detection with respect to a plurality of points by the use of one umbrella-shaped sensor. In order to perform detection with respect to a plurality of points, the number of umbrella-shaped sensors provided must be increased. From the viewpoint of design, however, it is almost impossible to provide more than two umbrella-shaped sensors on the holder.

As a result, it is difficult to effect detection at as many points as required, making it impossible to perform fine control. In addition, since an umbrella-shaped sensor has a lot of movable parts, it is vulnerable to the occurrence of failure.

SUMMARY OF THE INVENTION

In view of the above-described circumstances, it is an object of the present invention to provide a bladder-type accumulator with a sensor enabling fine control.

Another object of the invention is to reduce the number of movable parts required, thereby lengthening usable life.

According to the present invention, a guide is provided on a plug of a vessel body in such a manner as to project into a bladder, a cup-shaped sensor is slidably provided on the guide, a switch actuation element, such as a magnet, is provided on the cup-shaped sensor, and a switch such as a magnetic proximity switch, is provided on a side portion of the locus of movement of the switch actuation element. The cup-shaped sensor is caused to slide along the guide by the bladder which is deformable in accordance with variation in the amount of liquid within the accumulator, so as to actuate the switch.

DESCRIPTION OF THE PREFERRED EMBODIMENTS

Figure 1:
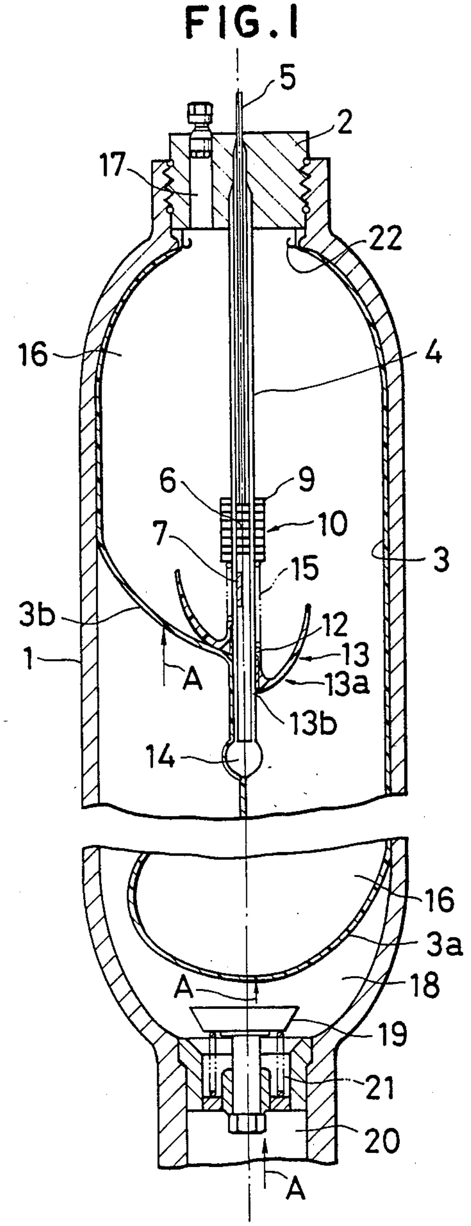
FIGS. 1 and 2 are sectional views illustrating a first embodiment of the present invention, FIG. 1 being a longitudinal sectional view of an accumulator in accordance with the embodiment, and FIG. 2 being an enlarged sectional view of essential parts shown in FIG. 1.

The preferred embodiments of the present invention will be described with reference to the accompanying drawings. A first embodiment will be described with reference to FIGS. 1 and 2.

A vessel body 1 has a plug 2, and one end of a guide 4, which projects into a bladder 3, is fixed to the plug 2 in an air-tight manner.

The bladder 3 is a pleated bladder which is capable of regularly deforming. That is, three folds each of which extends longitudinally of the bladder 3 are provided circumferentially at equal intervals, so that the section of the bladder 3 that includes its radius becomes star-shaped when the bladder 3 is deformed (see U.S.P. 3,277,925).

The guide 4 is formed of a non-magnetic pipe. Within the guide 4, a piston magnet 6 supported by a magnet holder 5 and a movable-type magnetic proximity switch 7 are provided in spaced relation to each other.

The piston magnet 6 comprises magnet members which are stacked with yokes 8 disposed therebetween. The magnet 6 opposes an external movable magnet 9 accommodated in an external movable element holder 10.

The external movable magnet 9 comprises magnet members which are stacked with yokes 11 disposed therebetween. Each member of the magnet 9 has a polarity with which the the member magnet is capable of attracting each member magnet of the piston magnet 6.

A cup-shaped sensor 13 is provided with a magnet 12 and has a central through hole portion 13*b* that is mounted around on an outer periphery of the guide 4 in such a manner as to allow the sliding of the sensor 13.

An umbrella portion 13*a* of the sensor 13 is formed into a cup shape and by the use of a non-magnetic material, in order to prevent breakage of the bladder 3. The through hole portion 13b of the sensor is formed of a cylinder of a non-magnetic metal such as stainless steel, having a diameter slightly larger than the diameter of the guide 4.

Figure 2:
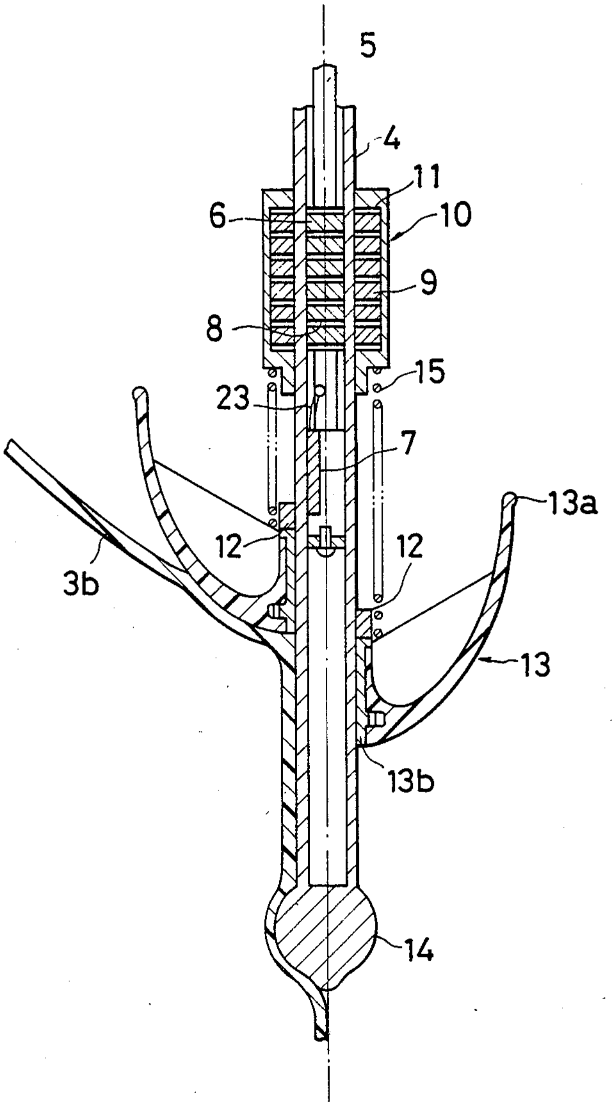

The accumulator shown in FIG. 1 also has a stopper 14 provided on the other end of the guide 4, a balance spring 15 establishing connection between the external movable element holder 10 and the cup-shaped sensor 13, a gas chamber 16 communicating with a gas supply/discharge port 17, a liquid chamber 18, a valve body 19 for opening and closing a liquid inlet/outlet port 20, a spring 21, a bladder cap 22, and a lead 23.

Next, the operation of the accumulator in accordance with the first embodiment will be described. When the magnet holder 5 is vertically moved to adjust the relative position of the piston magnet 6 and the movable-type magnetic proximity switch 7, the external movable magnet 9 is moved by being attracted by the magnet 6, and the external movable element holder 10 is also moved.

By these movements, the position of the cup-shaped sensor 13 is also adjusted via the balance spring 15.

When the pressure of a liquid A under pressure in a fluid pressure circuit (not shown) increases to a level higher than the pressure charged within the bladder 3, the valve body 19 opens, and the liquid A flows into the liquid chamber 18 through the liquid inlet/outlet port 20.

As a result, the bladder 3 moves upward by being pushed by the liquid A, thereby being brought into a condition indicated at 3*a* in FIG. 1. With this condition, the bladder 3 is does not contact with the cup-shaped sensor 13, and therefore, it causes no change in the position of the cup-shaped sensor 13.

Accordingly, at this time, the movable-type magnetic proximity switch 7 is not turned on, resulting in no alarm or the like being generated.

When the pressure of the liquid A under pressure further increases, the bladder 3, which is being pushed by the liquid A, undergoes radial deformation. At this time, since the bladder 3 is pleated, it is regularly folded at its folds so that its section including its radius becomes star-shaped.

By this deformation of the bladder 3, the cup-shaped sensor 13, which is being pushed, is moved upward along the guide 4, thereby being brought into a condition indicated at 3*b*.

At this time, since the magnet 12 of the cup-shaped sensor 13 is simultaneously moved, it approaches to the movable-type magnetic proximity switch 7, thereby positively turning on the switch 7. This action causes the generation of an alarm or the like.

On the other hand, when the pressure of the liquid A under pressure drops, the bladder 3 moves downward, thereby causing the magnet 12 to become distant from the movable-type magnetic proximity switch 7. As a result, the switch 7 is turned off, thereby stopping the alarm or the like.

Figure 3:
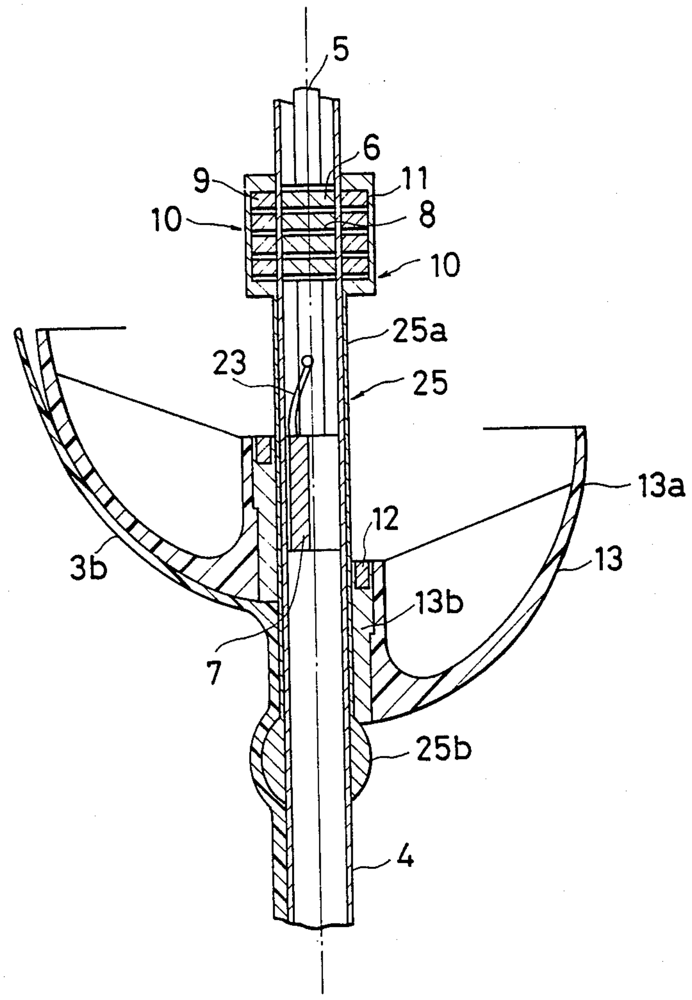
FIG. 3 is a sectional view corresponding to FIG. 2, which illustrates a second embodiment.

A second embodiment will now be described with reference to FIG. 3. The main difference of the second embodiment from the first embodiment is that the external movable element holder 10 is made continuous with a stopper 25 provided with a guide portion, i.e., a stopper comprising a tubular guide portion 25*a* and a stopper portion 25*b*. Further, the central through hole portion 13*b* of the magnet-provided cup-shaped sensor 13 is fitted on the guide portion-provided stopper 25 in such a manner as to allow the sliding of the sensor 13.

With this arrangement, therefore, the magnet-provided cup-shaped sensor 13 is vertically moved along the tubular guide portion 25*a*, so as to turn on and off the movable-type magnetic proximity switch 7.

Figure 4:
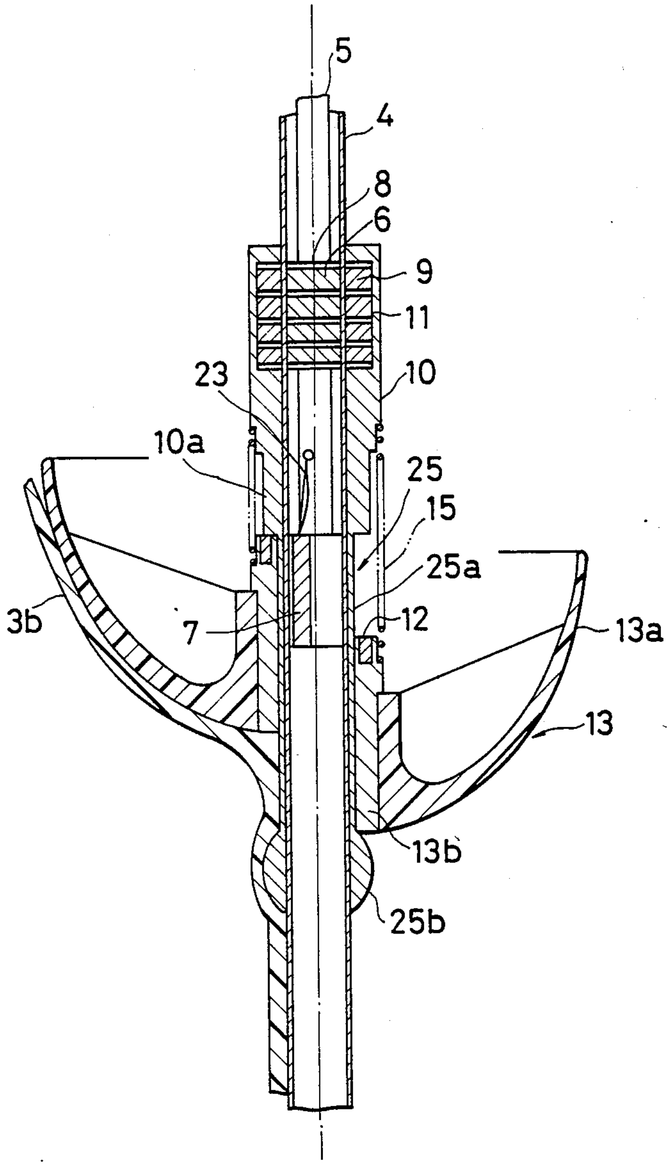
FIG. 4 is a sectional view corresponding to FIG. 2, which illustrates a third embodiment.

A third embodiment will be described with reference to FIG. 4. The third embodiment is distinguished from the second embodiment in that the balance spring 15 is provided between the external movable element holder 10 and the magnet-provided cup-shaped sensor 13, and that the external movable element holder 10 has a magnet stopping portion 10*a* formed at the lower end thereof.

With this arrangement, therefore, the cup-shaped sensor 13 is prevented from moving to a position above the magnet stopping portion 10*a* and, simultaneously, the magnet 12 is accurately brought into opposing relation with the movable-type magnetic proximity switch 7, whereby the switch 7 is positively turned on. In other words, with the above-described arrangement, it is possible to prevent the magnet 12 from passing the position of the movable-type magnetic proximity switch 7 due to excessive upward movement of the cup-shaped sensor 13.

Figure 5:
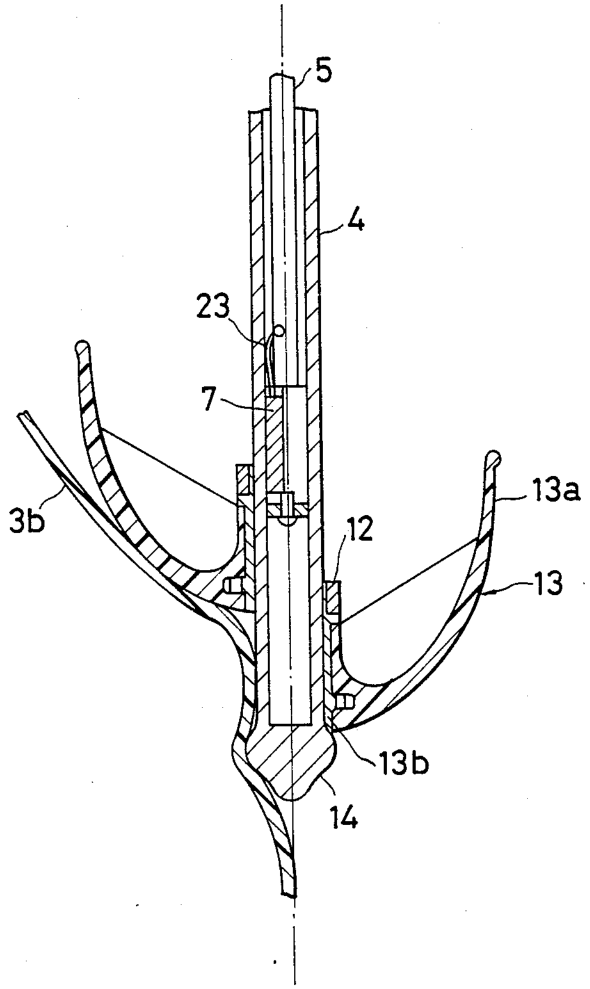
FIG. 5 is a sectional view corresponding to FIG. 2, which illustrates a fourth embodiment.

A fourth embodiment will be described with reference to FIG. 5. The fourth embodiment is distinguished from the first embodiment in that none of the piston magnet in which magnet members are stacked, the external movable magnet, and the balance spring is provided.

With the fourth embodiment, therefore, the structure is simple as compared with the first embodiment.

Figure 6:
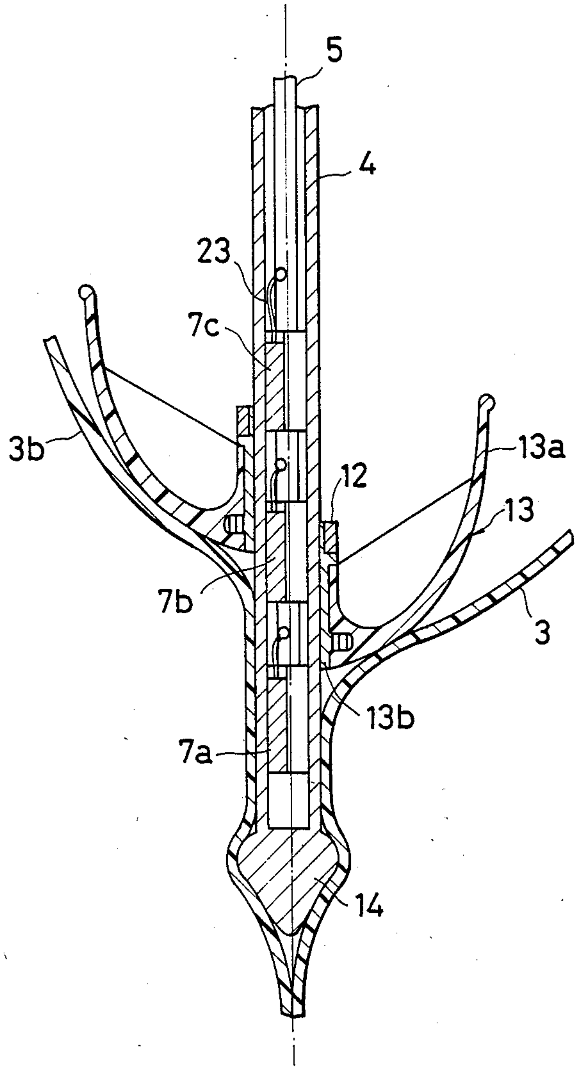
FIG. 6 is a sectional view corresponding to FIG. 2, which illustrates a fifth embodiment.

A fifth embodiment will be described with reference to FIG. 6. The fifth embodiment is distinguished from the fourth embodiment in that a plurality of movable-type magnetic proximity switches 7*a*, 7*b*, and 7*c* are provided with intervals therebetween.

These movable-type magnetic proximity switches 7*a*, 7*b*, and 7*c* are controlled by a magnet 12 of a single cup-shaped sensor 13.

With this arrangement, therefore, in contrast with the fourth embodiment, the single cup-shaped sensor 13 is capable of performing detection with respect to each of a plurality of points, thereby making it possible to detect each of different amounts of liquid stored.

A sixth embodiment will be described with reference to FIGS. 7 and 8.

A bladder 32 is inserted into a vessel body 31, then a flange portion 33 of the bladder 32 is held by part of the vessel body 31, part of a plug 34, and a bladder cap 33*a*.

The bladder 32 is a pleated bladder formed of a soft elastic material such as rubber. The inner surface of the bladder 32 is formed with three folds 32*b* which extend in the longitudinal direction and are arranged in the circumferential direction at equal intervals, as shown in FIG. 8.

The central portion of the plug 34 is formed with a portion 36 receiving a rod 35. Further, the rear end portion of a guide 39, which projects into the bladder 32, is secured to the receiving portion 36.

The rod 35 is slidably supported by the guide 39. A central portion 38 of the bottom of a cup-shaped sensor 37, formed of a non-magnetic material, is fixed to the tip of the rod 35. An actuation element, such as a magnet 40, is provided at a rear end portion of the rod 35 by fixing the element to a support 35*a*. The rod 35 has a pin 41 connected via a spring 42 to a stopper 44 provided at the tip of the guide 39. The resilience of the spring 42 is set at a value balanceable with the total weight of the cup-shaped sensor 37 and other movable members.

A switch 43 is provided in the vicinity of the receiving portion 36 by being inserted in a small hole formed in the upper surface of the plug 34. The switch 43 is a noncontact switch, such as a magnetic proximity switch, which is actuated when the magnet 40 approaches thereto.

If such a magnetic proximity switch is used, each of the plug 34, a gas supply port 45 mounted on the plug 34 in an air-tight manner, the guide 39, and the rod 35 is made of a non-magnetic material.

Needless to say, a photoelectric switch may alternatively be used as the switch 43.

Next, the operation of the accumulator in accordance with this embodiment will be described.

When gas is introduced from the gas supply port 45 and is allowed to flow through the receiving portion 36 and a small bore 46 formed in the guide 39, until a predetermined amount of gas is charged into the bladder 32, a predetermined pressure prevails within the bladder 32.

Figure 7:
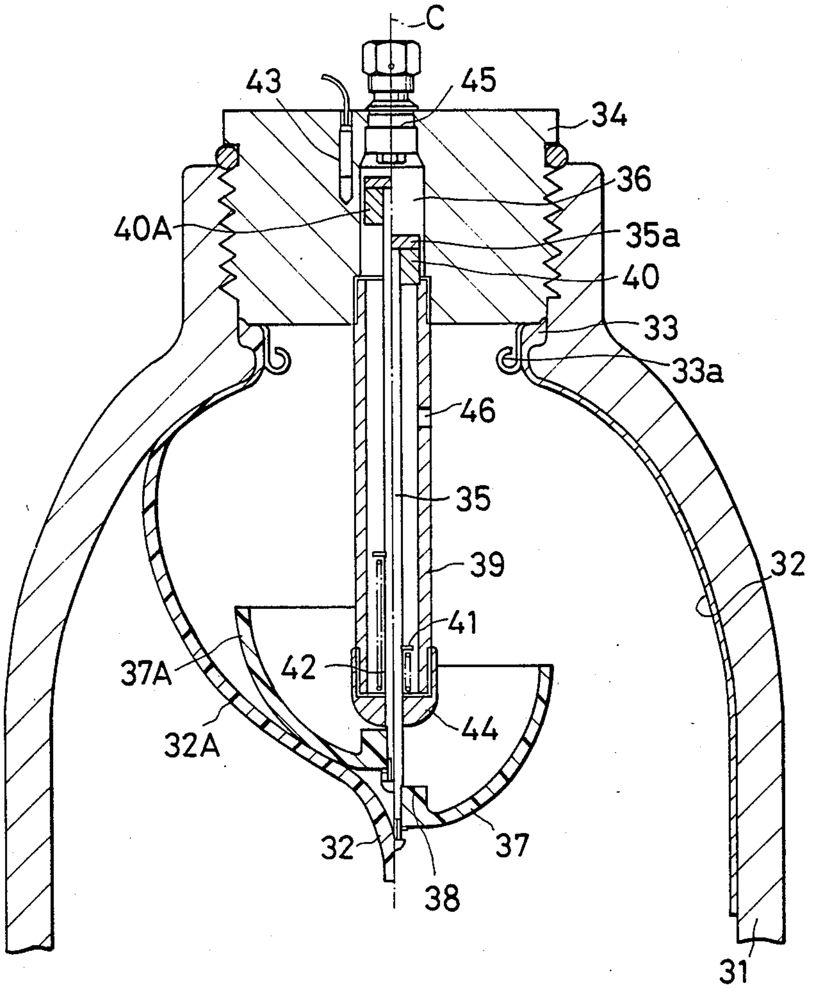
FIGS. 7 and 8 are sectional views illustrating a sixth embodiment.
Figure 8:
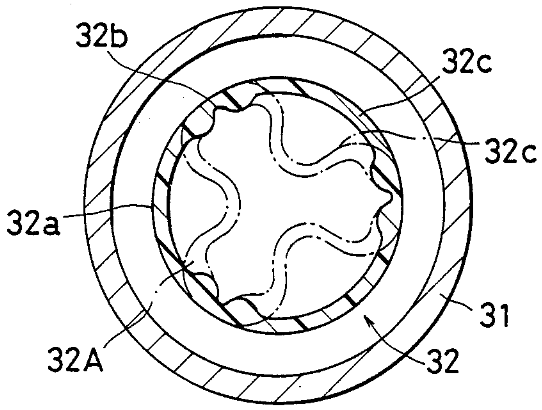

At this time, as shown in FIG. 7 on the right side thereof, the pleated bladder 32 is in close contact with the inner wall of the vessel body 31, while the cup-shaped sensor 37 is positioned at its lowest position, applying a compression load to the spring 42.

When a pump (not shown) is operated to pump liquid within a tank (not shown) to the inside of the vessel body 31 through a liquid inlet/outlet port (not shown), the bladder 32 regularly deforms as it is being compressed by the liquid pressure.

More specifically, because the bladder 32 is pleated, it gradually deforms from the lower portion thereof, with its trunk portion 32*a* being simultaneously folded at the folds 32*b*, so as to form a star-shaped cross-section.

However, the bladder 32 is not brought into contact with the cup-shaped sensor 37 so long as the compression is below an allowable limit or the amount of oil is below a set amount. Therefore, at this time, the sensor 37 is not moved. Consequently, the rod 35 does not slide and, hence, the magnet 40 does not move, resulting in the switch 43 not being actuated.

When the amount of liquid increases, however, and when the amount becomes so large as to bring about a condition in which the allowable compression limit of the bladder 32 is reached or the bladder 32 is moved beyond the allowable compression limit by a drop in the gas pressure due, for instance, to the permeation of the charged gas, deforming portions 32*c* of the bladder 32 move toward the center line C, thus causing the trunk portion 32*a* to be folded through to the upper portion thereof. In this way, the bladder 32 is deformed whereby it is brought into a condition denoted at 32A.

As described above, the deformation of the bladder trunk portion 23A gradually takes place from the lower portion of the bladder 32 to the upper portion of the same. Accordingly, the deforming portions 32*c* push the cup-shaped sensor 37 upward as they slide on the surface of the sensor 37. As a result, the sensor 37 is brought into a condition denoted at 37A on the left side of FIG. 7. Therefore, the rod 35 is gradually moved upward.

By this movement, the magnet 40 approaches to the switch 43, as denoted at 40A, so as to actuate the switch As a result, a detection signal is generated whereby a control valve (not shown) is closed and, simultaneously, an alarm is generated.

In order to actuate the cup-shaped sensor 37 at the set amount of oil, the following arrangement is made. The pressure at which the sensor 37 is actuated is set as a reference pressure, and, during daily operation, each pressure at which the sensor 37 is actuated is compared with the reference pressure.

If the pressure at which the sensor 37 is actuated is lower, this means that the charged pressure within the bladder 32 has dropped. In this case, therefore, a certain amount of gas is supplemented into the bladder, thereby achieving the reference pressure.

When a liquid stored in the accumulator is required by a liquid pressure system, a control valve (not shown) is opened to discharge the stored liquid.

At this time, the bladder 32 gradually expands while the liquid pressure decreases. The decreasing liquid pressure is detected by a pressure switch (not shown), and the pump is restarted to deliver liquid to the inside of the vessel body 31 until a prescribed amount of liquid is stored.

In the event that the bladder 32 is broken, the cup-shaped sensor 37 is actuated by the buoyancy caused by liquid which has entered the bladder 32. If no liquid enters the bladder 32, the cup-shaped sensor 37 is pushed upward by the deformation of the bladder 32, so as to actuate the switch 43. In this way, the generation of a detection signal is maintained, and the breakage of the bladder 32 can be detected.

Figure 9:
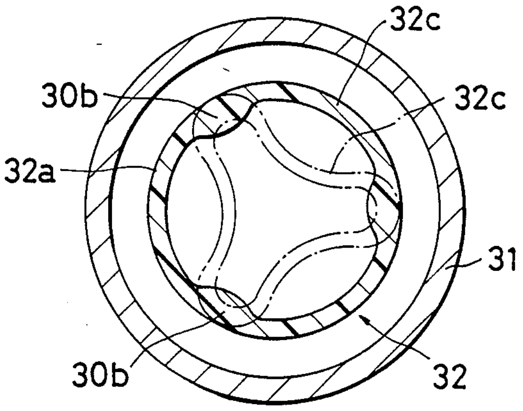
FIG. 9 is a cross-sectional view corresponding to FIG. 8, which illustrate a seventh embodiment.

A seventh embodiment will be described with reference to FIG. 9. The seventh embodiment is distinguished from the sixth embodiment in that, instead of forming the folds 32*a* of the pleated bladder 32*a* of the pleated bladder 32, thick-walled portions 30*b* are formed, as shown in FIG. 9, thereby enabling the bladder 32 to regularly fold.

It could naturally be understood that, if the switch is provided at a position corresponding to the stopping position of the cup-shaped sensor, the switch is turned on and off in the manner opposite to that described above.

What is claimed is:

1. A bladder-type accumulator with a movable cup-shaped sensor and a bladder, comprising: a vessel body having a plug; a guide provided on said plug in such a manner as to project into a bladder; a switch selectively positionable along said guide; a cup-shaped sensor movable along said guide in accordance with the deformation of said bladder; and a switch actuation element movable with said cup-shaped sensor.

2. A bladder-type accumular with a movable cup-shaped sensor and a bladder, comprising: a vessel body having a plug; a guide with two ends having one end thereof fixed to said plug, and projecting into a bladder; a movable-type magnetic proximity switch provided within said guide; a cup-shaped sensor provided with a magnet and formed with a central through hole portion fitted around said guide, said sensor being slidable in accordance with the deformation of said bladder; and a stopper provided on the other end of said guide.

3. A bladder-type accumulator with a movable cup-shaped sensor and a bladder, comprising: a vessel body having a plug; a guide having one end thereof fixed to said plug, and projecting into a bladder; a movable-type magnetic proximity switch and a piston magnet which are provided within said guide; an external movable magnet provided on an outer periphery of said guide and capable of attracting said piston magnet; a cup-shaped sensor provided with a magnet and formed with a central through hole portion fitted around said guide, said sensor being slidable in accordance with the deformation of said bladder; and a balance spring provided between and establishing connection between said sensor and said external movable magnet.

4. A bladder-type accumulator with a movable cup-shaped sensor and a bladder, comprising: a vessel body having a plug; a guide having one end thereof fixed to said plug, and projecting into a bladder; a movable-type magnetic proximity switch and a piston magnet which are provided within said guide; an external movable magnet provided on an outer periphery of said guide and capable of attracting said piston magnet; a stopper having a guide portion and provided on said external movable magnet; and a cup-shaped sensor provided with a magnet and formed with a central through hole portion fitted around said guide portion of said stopper, said sensor being slidable in accordance with the deformation of said bladder.

5. A bladder-type accumulator with a movable cup-shaped sensor, according to claim 4, further comprising a balance spring provided between said external movable magnet and said cup-shaped sensor provided with said magnet.

6. A bladder-type accumulator with a movable cup-shaped sensor, according to claim 3 or claim 4, wherein each of said piston magnet and said external movable magnet has a plurality of stacked magnet members with yokes disposed therebetween.

7. A bladder-type accumulator with a movable cup-shaped sensor, according to claim 3 or claim 4, comprising a single movable-type magnetic proximity switch.

8. A bladder-type accumulator with a movable cup-shaped sensor, according to claim 3 or claim 4, comprising a plurality of movable-type magnetic proximity switches provided at intervals in the axial direction of said guide.

9. A bladder-type accumulator with a movable cup-shaped sensor, according to any of claims 1, 2, 3, and 4 wherein said bladder is a pleated bladder.

10. A bladder-type accumulator with a movable cup-shaped sensor, according to any of claims 1, 2, 3, and 4, wherein said cup-shaped sensor is formed of an elastic body.

11. A bladder-type accumulator with a movable cup-shaped sensor, according to any of claims 1, 2, 3, and 4, wherein said cup-shaped sensor is capable of floating on the surface of liquid which has entered said bladder.

* * * * *